Sept. 20, 1971  F. F. LIU ET AL  3,605,729
FLUID FLOW METER SYSTEM
Filed April 13, 1970  3 Sheets-Sheet 1

FREDERICK F. LIU
TED W. BERWIN
MARVIN Q. LEE
INVENTOR

BY R. E. Geanque
ATTORNEY

CLOCKWISE

COUNTER-CLOCKWISE

FREDERICK F. LIU
TED W. BERWIN
MARVIN Q. LEE
INVENTOR.

United States Patent Office 3,605,729
Patented Sept. 20, 1971

3,605,729
FLUID FLOW METER SYSTEM
Frederick F. Liu, Northridge, Ted W. Berwin, Los Angeles, and Marvin Q. Lee, Granada Hills, Calif., assignors to Respiratory Bioelectronics Systems, Inc., Tarzana, Calif.
Filed Apr. 13, 1970, Ser. No. 27,667
Int. Cl. A61b 5/08
U.S. Cl. 128—2.08
18 Claims

ABSTRACT OF THE DISCLOSURE

A turbine flow meter system is disclosed which responds to respiratory flow rate of a patient. The flow meter system includes apparatus for indicating the direction of flow in the flow meter to distinguish inspiration from expiration. An electronic correlation scheme performs on line electronic correction of dynamic errors created in the turbine associated flow meter system. The correction scheme makes adjustment to the output of the flow meter system so that accurate simulation of the dynamic characteristic corrects the output therefrom.

BACKGROUND OF THE INVENTION (1) Field of the invention

This invention relates to dynamic fluid flow meter systems and more particularly to apparatus to correct dynamic errors caused by mechanical flow meters and to indicate the direction of flow so that inspiration can be distinguished from expiration.

(2) Discussion of the prior art

The measurement of human respiratory flow is of direct significance to the study of metabolic conditions. Of the various known flow meters now inexistence, including those based on thermal, hot wire, anemometer and pressure drop principle, the turbine type flow meter is preferred because of its improved accuracy, linearity and safety when used in pure oxygen conditions. In particular, other types of flow meters become ineffective when used in respiratory measurements under low pressure conditions of well below one atmosphere. A flow meter in accordance with some aspects of this invention is set forth in U.S. Pat. No. 3,135,116.

Despite its high accuracy in metering steady state gaseous flows, these prior art turbine flow meters suffer from certain inadequacy when dealing with respiratory flow. As is well known to those skilled in the art, the human respiratory flows includes both inspiring and expiring flow with the gas flow direction reversing during each cycle. The repetitious rate of human breathing is between one breath per second and ten breaths per minute, while the instantaneous flow rate may vary from 3 to 500 liters per minute. Even with the optimal mechanical design of turbine type flow meters, the inertial factors of the sensing turbine will cause dynamic error, particularly during the rising and falling portion of the breathing.

An accurate flow meter, therefore, should provide means for correcting such dynamic errors in order to enable the measurement of dynamic respiratory flow rate to become accurate. Further, the turbine flow meter should provide an electrical signal output which can be identified as to which portion is due to the inspiration and which portion is due to the expiration.

SUMMARY OF THE INVENTION

The present invention comprises, among other aspects, a turbine flow meter which is designed to achieve the optimal response to dynamic respiratory flow rate. This includes efforts to reduce the moment of inertia to the minimum, the selection of the angle of attack and other aerodynamic considerations. Means for insuring the inspiration flow and expiration flow measurements which will both have the same calibration constants are also included.

Briefly described the present invention includes a system for determining the breathing characteristics of a patient. The system includes a flow meter responsive to the breathing of a patient which provides electrical signals of a pulse-rate form whose frequency is indicative of the breathing period. This electrical signal is then converted into sets or ensembles of electrical pulse groupings having a frequency of the breath. The pulses are then converted to an electrical analog ramp signal which is indicative of the breath-by-breath flowrate. This analog ramp signal is then applied to a summer which is then coupled back through a feedback loop to the summer. A present corrector circuit is coupled in the feedback loop which automatically corrects the errors in the system and adds a correction signal into the analog output from the converter circuit. This approach is also applicable to digital output as well as analog output.

The present invention further includes method and electronic apparatus which enables the flow meter to indicate when it is measuring the inspiring flowrate and when it is measuring the expirating flowrate so that the signals due to the inspiring flow can be segregated from the signals of the expiring flow.

An electronic correction scheme is included which, when taken into consideration the limited dynamic response capable of a mechanical turbine, will automatically perform on line electronic corrections of the dynamic error due to such phenomena as over shooting, coasting and under shooting. The same electronic unit also permits simple adjustment so that it can provide accurate simulation of the dynamic characteristic, e.g., the transfer function of a turbine. When applied in a reverse fashion such a simulator enables the turbine flow meter to produce an output wave which is true to the actual dynamic respiratory flow phenomena.

In accordance with one embodiment or example of this invention a respiratory sensor is included which comprises a turbine type flow meter which responds to fluid flows and generates rotational flow of the turbine. This rotational flow is transduced into pulse rate output through the use of a dragless pickup. Since the pulse rate signal is of discrete nature, it is transformed into a continuous analogue function. This transformation is performed by a frequency-to-period-to-analogue computing means. Correction for the dynamic error of the mechanical motion is performed by the dynamic flow auto-corrector circuit. With this the output signal can be adjusted to provide an output having a waveform which is a close approximation of the actual respiratory flow rate. Thus the measurement of the magnitude of the flow is achieved. Further, the bi-directional discriminator is included to distinguish between inspiration and expiration.

The turbine flow meter of the prior art suffers from certain limitations which cannot be improved even with the best possible mechanical designs. Means are provided for governing the relationship of the turbine in response to respiratory flow. From this, electronic techniques are applied to correct the dynamic error of the flow meter.

The motion of the turbine can be analyzed rigorously by means of complex integral differential equations where pertinent fluid dynamic factors are considered. Such treatment can be found in the literature and especially in an article entitled Aerodynamics of the Airplane, written by C. B. Millikan and published by John Wiley & Son, New York 1948, and a further publication entitled, Continuous Measurement of Unsteady Flow, authored by G. P. Katys, published by Maximillian Company, New York 1964. The relationship between the actual flow to the meter and the flow indicated by the meter has also been set forth in the literature in an article entitled, The Theory of the Vane Anemometer, published in the Philosophical Magazine, Series 7, 2, 1926 on page 88, authored by E. Owers, and in an article of the same publication entitled, On the Response of the Turbine Flow Meter, in Series 723, 1937, page 992. This has further been distinguished in an article entitled Transient Response of the Turbine Flow Meter in the Jet Propulsion Journal, authored by J. Grey on Feb. 19, 1966, on page 98. In the latter articles the relationship between the actual flow to the meter and the flow indicated by the meter using air foil theory was set forth. In the present application, however, the equation of motion can be derived from another point of view which will be more relevant to the present disclosure. Similar consideration is found in an article, Dynamic Response of Turbine Flow Meters in the publication, Instrument Review, June 1966, page 241, authored by H. H. Dijstelbergen.

DESCRIPTION OF THE DRAWINGS

These and other features and advantages will become more apparent to those skilled in the art when taken in consideration with the following detailed descriptions wherein like reference numerals indicate the like and corresponding parts throughout the several views and wherein.

DESCRIPTION OF ONE PREFERRED EMBODIMENT

Figure 1A:
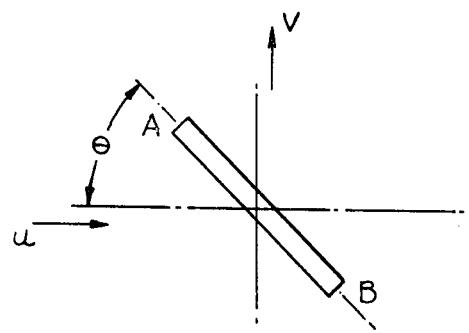
FIG. 1a is a blade of a flow meter turbine used for analysis purposes.
Figure 1B:
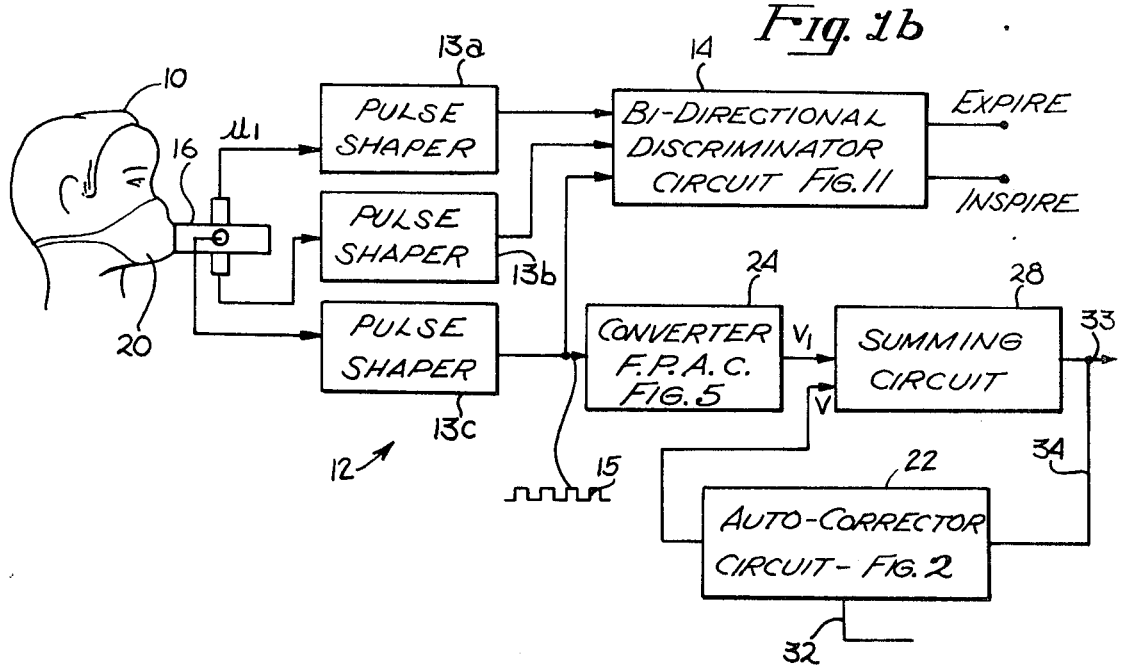
FIG. 1b is a block diagram of a bi-directional flow meter system in accordance with the principles of a single embodiment of this invention.

Turning now to a more detailed description of one preferred embodiment of this invention there is shown in FIG. 1b a patient designated by the numeral 10 and circuitry 12 for determining the flow rate of the breathing of the patient 10. In medical practice it is sometimes necessary to determine such flow rates for diagnostic purposes. In the embodiment set forth a bi-directional discriminator 14 is included to discriminate between inspiring and expiring breaths. The construction and operation of the bi-directional discriminator will be set forth in detail herein. The outputs from the turbine flow meter 16 are electrical signals. These electrical signals are applied to a pulse shaper 13 where they are converted to relatively short duration pulses for subsequent use.

The flow meter or turbine 16 is attached to a respiratory mask 20 to provide electrical signals in response to the breathing of the patient 10. A suitable flow meter may be the type set forth in U.S. Patent No. 3,135,116. The flow meter 16 includes three outputs 16a, 16b and 16c, as better shown in connection with FIG. 6.

Square wave pulses from pulse shaper 13 in response to the flow meter 16 have a frequency which is indicative of the flow rate. The output pulses from circuit 13 are then applied to a converter 24 where they are converted to an analog level $V_1$.

The output of the converter 24 is then appiled as one input to a suitable summing circuit 28. A second input to summing circuit 28 emanates from an autocorrector circuit 32 which is described in more detail in connection with FIG. 2. The output of the summing circiut 28 is provided on output circuit 33 which is a DC level indicative of the flow rate of the breathing of the patient 10. Auto-corrector circuit 32 receives the output of summing circuit 28 by a feedback line 34.

The auto-corrector circuit 32 performs the task of correcting certain dynamic errors which occur in the flow meter turbine 16. The behavior of the turbine type flow meter as set forth in U.S. Pat. 3,135,116 suffers from certain limitations which cannot be improved within the mechanical structure thereof. However, in accordance with the present invention certain of the dynamic errors are corrected.

The motion of the turbine can be analyzed rigorously by means of complex integral-differential equations wherein all pertinent fluid dynamic factors are considered.

Referring to the diagram set forth in FIG. 1a which represents a cross-section of the tip of a blade of the turbine in flow meter 16, and in the following analysis, let:

AB=tip of blade
$a$=area of cross-section of flow meter duct
$\theta$=effective blade angle
$r$=effective radius of turbine rotor
$\rho$=density of fluid
$u$=actual flow velocity
$v$=indicated velicity
$I$=moment of inertia of rotor
$\omega$=angular velocity of turbine
$k$=frictional constant
$m$=mass of fluid The component of the velocity of fluid in the direction of motion of the turbine $Vy$ is given by:

$$Vy = u \tan \theta_0 - v$$

and the amount of fluid flowing through the meter per unit time is:

$$\frac{dm}{dt} = \rho a |u|$$

Thus, the torque applied to a unit area of the turbine blade is given by:

$$T = F \cdot r = \frac{d}{dt}(mV_y) \cdot r = \left[\left(m \tan \theta_0 \frac{du}{dt} - m \frac{dv}{dt}\right) + V_y \frac{dm}{dt}\right] \cdot r$$

Since $$m \frac{du}{dt} \tan \theta_0 \text{ and } m \frac{dv}{dt}$$

are virtually equal and opposite forces, it can be assumed that they nearly cancel out each other.

Consequently, $$T = V_y \cdot \frac{dm}{dt} \cdot r \rho a |u| r (u \tan \theta_0 - V)$$

However, knowing that this torque is the rate of change of momentum, then:

$$T = I \frac{d\omega}{dt} \qquad (1)$$

Taking into account a small friction term, then:

$$T = I\frac{d\omega}{dt} + k\omega$$

Rearranging:

$$\frac{I\cos\theta_0}{r^2}\cdot\frac{dv}{dt} + \frac{k\cos\theta_0}{r^2}\cdot v = \rho a|u|(u\sin\theta_0 - v\cos\theta_0)$$

Put $$A = I\cos\theta_0/r^2;\ B = k\cos\theta_0/r^2;\ C = \rho a$$

And thus arriving at:

$$A\dot{v} - Bv = C|u|(u\sin\theta_0 - v\cos\theta_0) \quad (II)$$

The angle $\theta_0$ will approach $\theta$ as the velocity $v$ becomes more stable. Thus, in actual practice, $\theta_0$ can be replaced by $\theta$. Equation II can also be verified by the following derivation:

In (I) let $\phi = ua$ be the actual flow rate and
$f = av \cot\theta$ be the indicated flow rate.

Neglecting bearing friction, the following would be obtained:

$$\frac{df}{dt} = a\cot\theta\frac{dv}{dt}$$

or $$\frac{dv}{dt} = \frac{1}{a}\tan\theta\frac{df}{dt}$$

Thus, Equation I would assume the form:

$$\frac{I}{r}\left(\frac{\tan\theta}{a}\frac{df}{dt}\right) = \rho r\phi\left(\frac{\phi\tan\theta}{a} - \frac{f\tan\theta}{a}\right)$$

or $$\frac{df}{dt} = \frac{\rho r^2}{I}\phi(\phi - f) \quad (III)$$

Again, if Equation III is written in the following form, the situation would be clearer.

Let $$K = \frac{\rho r^2}{I}$$

then $$\frac{I}{K\phi}\frac{df}{dt} + f = \phi \quad (IV)$$

If the input signal is a step function, $1/K\theta$ can be regarded as being constant, so that the solution of the above differential equation can be given by:

$$f(t) = K\phi(t)\left(1 - e^{\frac{-t}{\tau}}\right) \quad (V)$$

where $$\tau = \frac{C}{K\phi}$$

Figure 4:
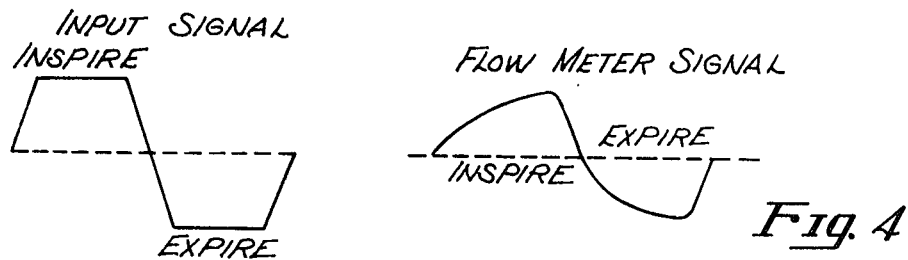
FIG. 4 is a graph of inspire and expire waveforms in conjunction with a flow meter output.

In this form, it is clear that for fixed $I$ and $\theta$, as $\phi$ becomes small, $\tau$ would be large, so that the indicated signal would have rather high distortion. (See FIG. 4.) It is also clear that as $\phi$ becomes small, the friction factor becomes significant to the extent that it cannot be ignored.

Figure 2:
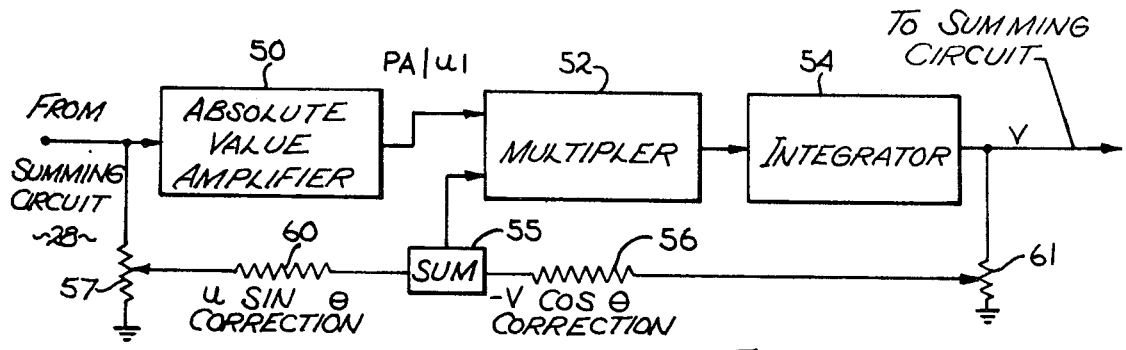
FIG. 2 is a block diagram of an automatic error corrector circuit of the system set forth in FIG. 1b.

In the final analysis, therefore, it can be concluded that the motion of the turbine can best be described by Equation II, and subsequently the system as set forth in FIG. 2 is applied accordingly to correct errors of the turbine flow.

Having established the mathematical relationship governing the dynamic response of the turbine to respiratory flow, the dynamic error of the measurement flow of the meter 16 can be corrected electrically in accordance with the present invention. This is accomplished by means of on-line simulation and correction of the signal emerging directly from the flow meter's pickup, as set forth in U.S. Pat. No. 3,135,116. The essential element which performs this correction is a flow rate auto-corrector circuit 22 set forth in FIG. 2. This is an analogue/digital computer which simulates the motion of the turbine flow meter 16 as described by Equation II. The other major component includes a non-linear Frequency-to-Period-to-Analogue Computer which renders discrete pulse rate signal of the flow meter into a continuous analogue function. A Frequency-to-Period-to-Analogue computer such as used in this embodiment is fully described in the embodiment set forth in the IRE Transactions on Electronic Computers, March 1960, page 959 et seq. in an article entitled "Frequency-to-Period-to-Analog Computer for Flowrate Measurements," authored by T. W. Berwin, one of the co-inventors named herein.

Figure 5:
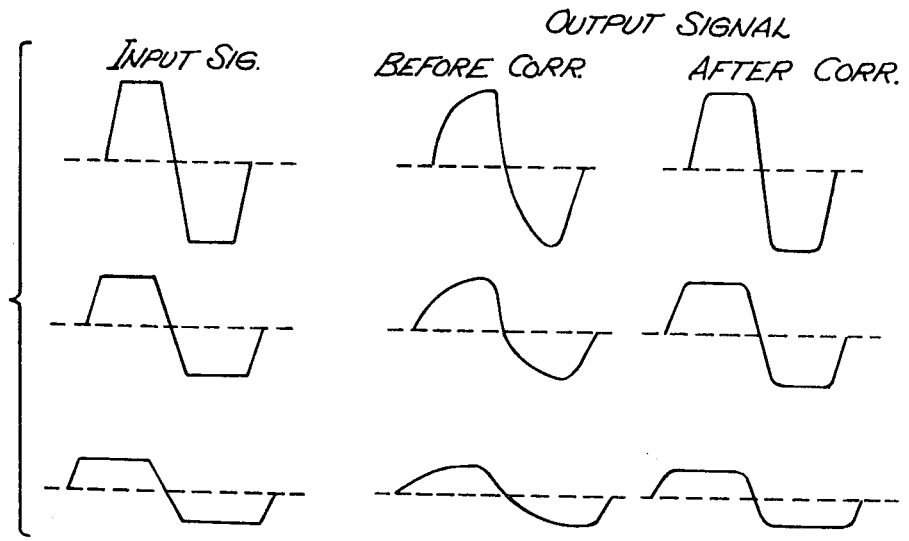
FIG. 5 is a graph illustrating inspire and expire waveforms error corrected in accordance with the principles set forth in FIG. 1b.

Using the auto-correction circuit 22, the actual correction is carried out by the circuit as shown in FIG. 2. The graph depicted in FIG. 5 indicates the input signal and the flow meter signal, both before and after correction. In FIG. 5 three different graphs are shown indicative of different flowrate characteristics.

Referring now to FIG. 2, a more detailed block diagram and schematic diagram is shown of the auto-corrector circuit 22. The circuit 22 includes an absolute value amplifier 50 which receives the output of summing circuit 28. Amplifier 50 provides a positive going signal on the output thereof regardless of the input. The output signal from amplifier 50, referred to as $\rho a/u/$ is applied to a multiplier 52 which multiplies the absolute value output with a sin/cos correction signal referred to as $-V\cos\theta + u\sin\theta$. The output of multiplier 52 is integrated by an integrator 54 and provides a correction signal V to the summing circuit 28 set forth in FIG. 1. Integrator 54 corrects both friction and mass. Both are equalized by integrating them together.

To provide the sin/cos correction signal $$-V\cos\theta + u\sin\theta$$

the output of integrator 54 is applied through a cosine correction resistor 56 to a summer 55. There it is summed with the input to the absolute value amplifier 50 which is first applied through a sine correction resistor 60. The inputs to resistors 56 and 60 are applied through potentiometers 57 and 61, respectively, for making adjustments necessary in the overall sine/cosine correction signals to multiplier 52.

Figure 3:
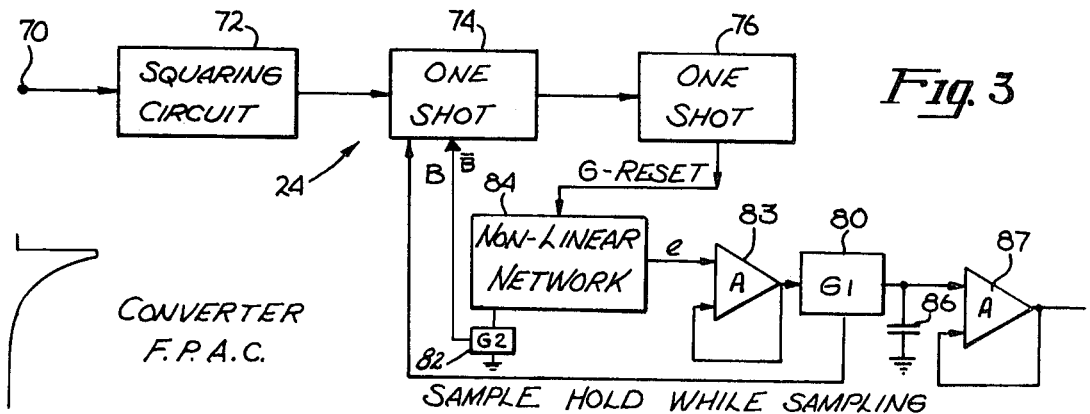
FIG. 3 is a block diagram of a converter used in the system set forth in FIG. 1b.

Referring now to FIG. 3 there is shown a more detailed block diagram of the converter 24 which includes an input 70 which receives pulses as set forth in graph 15 in FIG. 1. The repetitious rate or frequency of the pulses is indicative of the flow of air through the flow meter 14. Terminal 70 applies the pulses to a squaring circuit 72 which in effect squares the pulses for further use.

The output of squaring circuit triggers on a monostable multivibrator 74. For simplicity monostable multivibrators will hereinafter be referred to as "one shots." One shot 74 in turn triggers a further one shot 76. The one shot circuit 74 provides output potentials referred to as B, $\overline{B}$, and one shot 76 provides an output G for use in sampling and resetting of gates 80 and 82, whereby gate 80 is triggered by B from one shot 74 and gate 82 is triggered by the complement pulse $\overline{B}$.

The output G of one shot 76 is coupled into a non-linear network 84 which provides an output voltage of $$e = \frac{k_3}{t}$$

where $t$ = time and $k_3$ is a constant which preferably is fixed by design at a value of 0.01. The operation and theory of the frequency-to-period-to-analog converter is described in the aforementioned IRE transactions.

During the sampling period when one shot 74 is enabled, the potential B is present. However, at the beginning of the period $$t = T = \frac{1}{f}$$

so that potential $$e = \frac{k_3}{T} = k_3 F$$

This potential is held at $e=k_3F$ for the duration of the sample period, during which gates 80 and 82 are closed by being held into a hold capacitor 86 which is charged to the voltage $e=k_3F$. This voltage is held until the next sampling time.

The reset period is dictated by the period when one shot 76 is enabled. When sampling is over, one shot 76 proved the voltage $e$ from non-linear network 84 at a fixed level. When reset time is over, voltage begins dropping according to the equation $$e = \frac{k_3}{t}$$

At time $$t = \frac{1}{F}$$

sampling again occurs and the sequence of operation is repeated. The output of non-linear network 84 is applied to an operational amplifier 83 where it is converted to a D.C. level before being applied to gate 80. Likewise, the output stored in capacitor 86 and gated by gate 80 is applied to the operational amplifier 87. When G2 gate 82 is enabled by $A\overline{B}$ from one shot 74, the contents of non-linear network 84 is gated to operational amplifier 83 where the D.C. level therefrom gates G1 gate 80 and charges capacitor 86 again.

Figure 6:
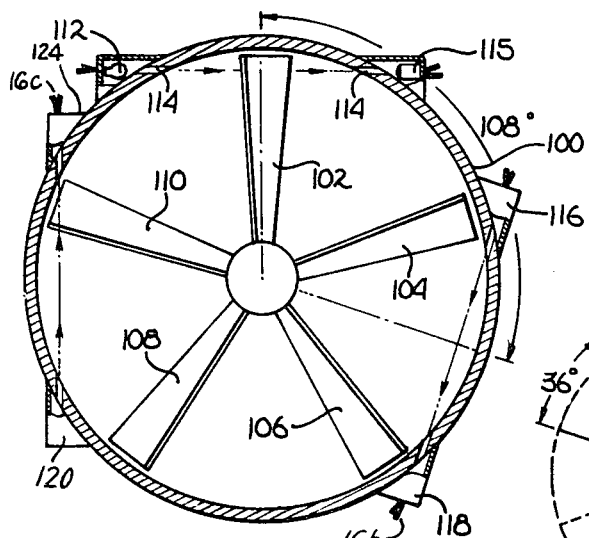
FIG. 6 is a cross section of the flow meter set forth in FIG. 1b illustrating impeller blades therein.

In order to determine whether the patient 10 is inspiring or expiring (inhaling or exhaling), a bi-directional discriminator 14 is provided similar to the aforesaid patent which describes the operation of the flow meter 16. The flow meter 16 as shown in FIG. 6 includes a housing 100 which in this particular embodiment is circular in shape and includes a plurality of impeller blades 102, 104, 106, 108 and 110. In this preferred embodiment, there are shown five impeller blades. To locate certain postions of the impeller blades, for example, a lamp 112 is provided to radiate light through a hole 114 within the housing 100 and to be detected by a detector 115 disposed laterally across the housing 100. Each time the blade of the flow meter 16 passes between the light 112 and a photocell 115, the light beam therefrom is interrupted and a signal is detected by the detector 115. Two other lamps 116, 120 the pick-up heads 118 and 124 are positioned around the housing 100 of the flow meter 16 to provide signals at differing intervals. Thus, in this embodiment three pick-up heads are used with a five blade bi-directional flow meter.

The pick-up heads comprising lamp 112 and photocell 115 and the pick-up heads comprising lamp 116 and photocells 118 are displaced 108° from each other while pick-up head comprising lamp 120 and photocell 124 is displaced 90° from pick-up head comprising lamp 112 and photocell 115. This displacement is best shown in FIG. 6.

It should be understood that other types of dragless pickups may be used such as magnetic coupled pickups or sensors, or the like.

Figure 11:
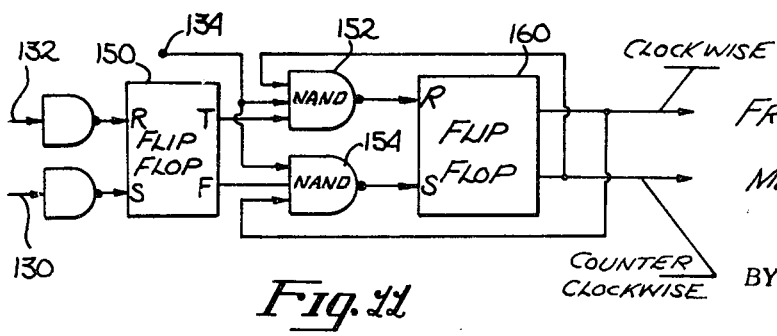
FIG. 11 is a block diagram of the circuitry of a bi-directional discriminator.

The output of photocell 115 is coupled into terminal 130 shown in FIG. 11, the output photocell 118 is coupled into terminal 132 of FIG. 11 and the output of photocell 124 is coupled into terminal 134 of FIG. 11.

When the turbine is rotating a pulse is generated at each pick-up head each time a blade passes under the pick-up area and interrupts the corresponding lamp. Because of the mechanical characteristics of each turbine blade, the pulse generated as the blade passes beneath the pick-up head is too long in duration. To improve this situation, pulse shaper 13a 13b and 13c, as shown in FIG. 1b, is used to generate a pulse of say, for example, 50 to 200 nanoseconds in duration each time the leading edge of a turbine blade passes under a respective pick-up. The pulse train generated by each of the three pick-up heads are illustrated in FIG. 9 for clockwise rotation and in FIG. 10 for counterclockwise rotation.

With reference to FIG. 11 the pulses detected by detector 115 and applied to terminal 130 are used to set an RS flip-flop 150 while the pulses generated by pick-up head 118 are used to reset this same flip-flop 150 through terminal 132. The output of flip-flop 150 is applied to one enabling input to a NAN gate 152 and the other output of flip-flop 150 is applied as one enabling input to a NAND gate 154. With this arrangement, the RS flip-flop 150 is enabled for 36- of every 72° of physical rotation of each blade that passes under pick-up head comprising lamp 112 and photocell 114. This action occurs regardless of direction in which the turbine rotates. The pulses generated by the pick-up head comprising lamp 120 and photocell 124, however, are developed at different times with respect to the RS flip-flop enabled time for clockwise and counterclockwise rotation.

Figure 8:
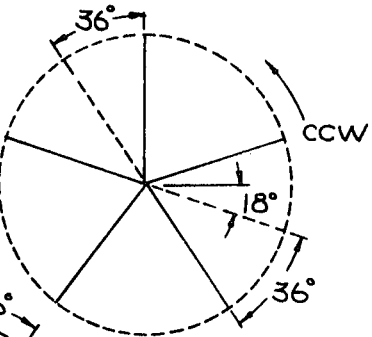
FIGS. 7 and 8 are graphs showing angular relationships of the impeller blades of the flow meter set forth in FIG. 6 for clockwise and counterclockwise rotation thereof.
Figure 7:
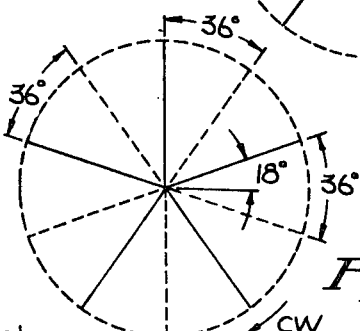
Figure 9:
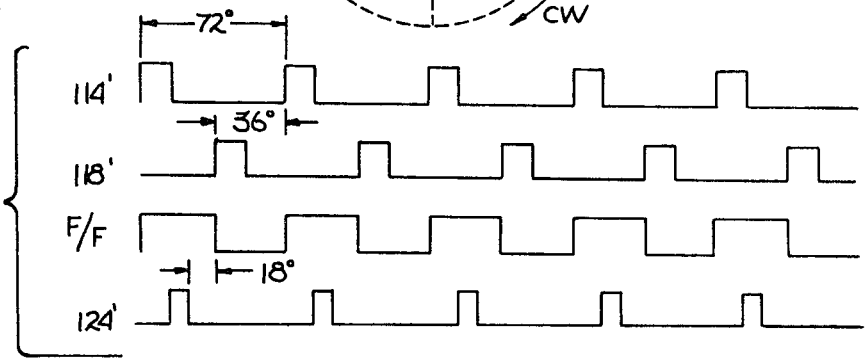
FIG. 9 is a graph illustrating waveforms of the circuitry in connection with the blades in FIG. 6 and the circuitry set forth in FIG. 11 when the impeller blades are rotating in a clockwise direction.
Figure 10:
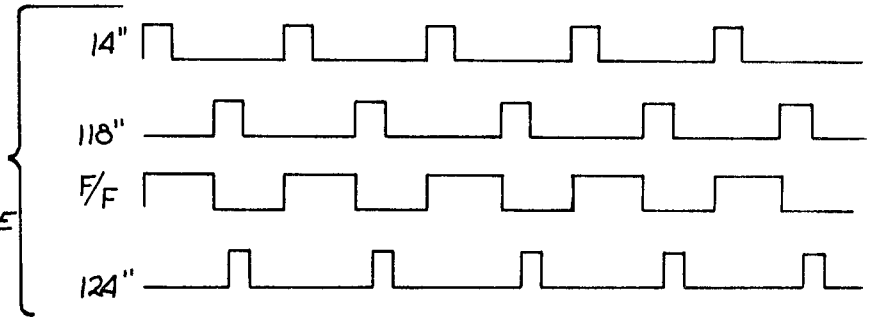
FIG. 10 is a graph illustrating waveforms as set forth in FIG. 9 with the impeller blades rotating in a counter-clockwise direction.

The time of occurrence of the pulses appearing on the detectors 114, 118 and 124 for clockwise rotation is shown in FIG. 9 and the output signals and their time of occurrence of photocells 114, 118 and 124 are shown in FIG. 10 for clockwise rotation in their time of occurrences. If the turbine blades are moving in a clockwise direction, the pulse generated by pick-up 124 will occur after 18° of mechanical motion (see FIGS. 7 and 8). At this time, the RS flip-flop 150 enables a three input NAND gates 152 and 154 to detect the particular condition. The output of NAND gate 152, for example, will go low (zero volts) causing the output of the RS flip-flop 160 to go high indicating clockwise rotation to the remainder of the system. This condition will only occur when the RS flip-flop 150 is enabled, the pulse is present from pick-up 124 and the output of RS flip-flop 160 is in the counterclockwise state. Therefore, once the RS flip-flop changes, the outputs of flip-flop 160 change to the clockwise state and it will remain so unless the turbine changes its direction of rotation.

When the turbine changes direction to a counterclockwise rotation, the pulses generated by pick-up head 124 will occur when the input to RS flip-flop 150 is not enabled. This condition occurs because the turbine blade passing under pick-up head 124 has also passed under pick-up head 124 has also passed under pick-up head 118 resetting the RS input flip-flop 150. This condition is detected by another three input NAND gate 154 which then resets the output of flip-flop 160 to the counterclockwise state. This condition will only occur when the input RS flip-flop 150 is disabled, the pulses present from pick-up 124 and the output flip-flop 160 is in a clockwise state.

Thus it can be seen in connection with FIGS. 9 and 10 that the pulses from pick-up heads 114 and 118 are used to generate a time interval during which time pick-up head 124 is monitored. If the pulses from pick-up head 124 occur during this interval, the direction must be clockwise. If they occur after the interval, the direction must be counterclockwise. This technique operates regardless of the speed of rotation.

The indication of the direction of flow is provided in the form of electric pulses. When the direction is clockwise, a pulse will only appear at the CW output terminal which lasts for the entire duration of clockwise motion. During this period, no electrical pulse will be generated at the CCW output terminal. Conversely, when the direction is counterclockwise, an electrical pulse will appear at the CCW terminal and no pulse will appear at the CW terminal. Such pulses are used not only for direction discriminating purposes, but also used to sort out which part of the flow signal is due to inspiration, and which part is due to expiration.

While there has been described but one preferred embodiment of this invention, it should be understood that many alterations and modifications may be made thereto without departing from the spirit and scope of this invention.

What is claimed is:

1. In combination:

means adapted to be coupled in communication with a patient for providing electrical signals indicative of the fluid flow therefrom;

feedback means including means for determining the error characteristics in the fluid flow from said electrical signal providing means; and means responsive to said feedback means for introducing correction signals into the electrical signal which are indicative of the fluid flow wherein said feedback means includes:

a summing circuit including a first input for receiving said electrical signals, a second input, and an output for providing the corrected output pulse;

a feedback loop responsive to the output of said summing circuit and being coupled to the second input of said summing circuit;

a multiplier in said feedback loop, said multiplier including a first input coupled to the output of said summing circuit, a second input and an output circuit coupled to the second input of said summing circuit; and means for deriving a sin/cos correction signal, said means being responsive to the first input to said multiplier and the output of said multiplier and being coupled to the second input of said multiplier.

2. The system as defined in claim 1 and further including an integrator responsive to the output of said multiplier for integrating the signal to said correction signal.

3. In combination:

means adapted to be coupled in communication with a patient for providing electrical signals indicative of the fluid flow therefrom;

feedback means including means for determining the error characteristics in the fluid flow from said electrical signal providing means; and means responsive to said feedback means for introducing correction signals into the electrical signal which are indicative of the fluid flow;

said means for providing electrical signals indicative of the fluid flow including; means for converting the electrical signal into pulses having a frequency which is directly proportional to the rate of the fluid flow, and means for converting the pulses to a linear ramp signal having amplitude levels indicative of the pulse frequency; and said feedback means including; a summing circuit including a first input for receiving the linear ramp signal from said converting means, a second input, and an output for providing corrected output pulses, a feedback loop responsive to the output of said summing circuit and being coupled to the second input of said summing circuit, a multiplier in said feedback loop, said multiplier including a first input coupled to the output of said summing circuit, a second input, and an output, circuit coupled to the second input of said summing circuit, and means for deriving a sin/cos first input to said multiplier and to the output of said multiplier and being coupled to the second input of said multiplier.

4. The system as defined in claim 3 and further including an integrator responsive to the output of said multiplier for integrating the signal to said correction circuit.

5. The correction circuit as defined in claim 4 and wherein said means for deriving the sin/cos correction signal includes:

a first correction circuit for providing a correction signal $u \sin \theta$, said first correction circuit being responsive to the signal from said summing circuit;

a second correction circuit for providing a correction signal $-V \cos \theta$, said second correction circuit being responsive to the output of said multiplier; and a summer responsive to said first and second correction circuit and coupled to the second input of said multiplier.

6. Apparatus for determining the direction of fluid flow including:

a turbine including blades which are adapted to rotate in response to the direction of the fluid flow;

first pulse generating means responsive to said turbine for providing a pulse for every predetermined angular rotation of said turbine blades;

second pulse generating means responsive to said turbine for providing a second pulse for every predetermined angular rotation of said turbine blades, the occurrence of said second pulse being spaced in time with respect to the occurrence of first pulse;

a flip-flop having a set input coupled to said first pulse generating means and a reset input coupled to said second pulse generating means, said flip-flop having a first output being enabled when a first pulse is generated by said first pulse generator, and a second output being enabled when a second pulse is generated by said second pulse generating means; and third pulse generating means responsive to said turbine for providing a third pulse during a different predetermined angular rotation of said turbine blades the occurrence of which is timed so that the third pulse occurs in the absence of a first pulse from said first pulse generating means and a second pulse from said pulse generating means during the rotation of said turbine blades in a first direction and occurs in the presence of a first pulse and a second pulse during the rotation in a second direction.

7. The apparatus as defined in claim 6 and further including logic means responsive to said first pulse generating means, said second pulse generating means, and said third pulse generating means for determining whether a pulse is present or absent from said first and second pulse generating means during the time occurrence of a pulse of said third pulse generating means.

8. Apparatus for determining the direction of fluid flow including: a turbine including blades which are adapted to rotate in response to the direction of the fluid flow;

means for providing a first pulse and second pulse for every predetermined angular rotation of the blades of said turbine, said first pulse being spaced in time of occurrent with respect to the time of occurrent of said second pulse;

bistable means providing a first output triggered by said second pulse;

means for providing a third pulse at a different predetermined angular rotation of the blade of said turbine with respect to the time occurrence of said first and second pulse, the appearance of said third pulse being different in time with respect to said first and second pulse depending upon the direction of rotation of the blades of said turbine; and logic means responsive to said first and second outputs of said bistable means and to said third pulse for providing a first output signal when said third pulse coincides with said first output of said bistable means and a second output signal when said third pulse coincides with said second output of said bistable means.

9. A fluid flow direction computing apparatus including:

a turbine including a plurality of equispaced blades being adapted to rotate in a first direction when fluid flows in one direction and to rotate in a second direction when fluid flows in a second direction;

a first transducer disposed on said turbine and being adapted to provide a first electrical pulse each time one of said blades of said turbine passes thereby;

a second transducer disposed on said turbine and being adapted to provie a second electrical pulse each time one of said blades of said turbine passes thereby, said first transducer being spaced from said second transducer so that the repetitious rate of said first pulse and second pulse are equally and alternately spaced;

a first flip-flop having a set input being coupled to said first transducer and a reset input being coupled to said second transducer, said flip-flop having a first output being enabled when the first electrical pulse is present from said first transducer and having a second output being enabled when the second electrical pulse is present from said second transducer;

a third transducer disposed on said turbine and being adapted to provide a third electrical pulse each time one of said blades passes thereby, said third transducer being spaced from said first and second transducer at a distance greater than the spacing between the occurrence of said first pulse and said second and less than the occurrence of spacing between pulses of one of said first and second transducers;

a second flip-flop having a set input and reset input, said second flip-flop having a first output enabled when an electrical pulse is provided to said set input and a second output enabled when an electrical pulse is provided to said reset input;

a first logic gate coupled to said set input of said second flip-flop and being enabled by the electrical signal of said third transducer, the signal of the first output of said first flip-flop and the signal of the second output of said second flip-flop; and a second logic gate coupled to said reset input of said second flip-flop and being enabled by the electrical signal of said third transducer, the signal of the second output of said first flip-flop and the signal of the first output of said second flip-flop.

10. The apparatus as defined in claim 9 and wherein said turbine including five equispaced blades.

11. The apparatus as defined in claim 9 and wherein said first and second transducers being spaced about 90° from one another and said third transducer being spaced about 108° from said first transducer.

12. The apparatus as defined in claim 11 and wherein said turbine including five equispaced blades.

13. A system for determining breathing characteristics of patient including:

a fluid flow direction computing apparatus for providing electrical signals indicative of the fluid flow therefrom;

feedback means including means for determining the air characteristics in the fluid flow from said electrical signal which are indicative of the fluid flow; and means for providing electrical signals indicative of the fluid flow, said means including means for converting the electrical signals received from said fluid flow direction computing apparatus into pulses having a frequency which is directly proportional to the rate of the fluid flow, and means for converting the pulses to a linear ramp signal having amplitude levels indicative of the pulse frequency;

a fluid flow meter comprising:

a turbine including blades which are adapted to rotate in response to the direction of fluid flow;

first pulse generating means responsive to said turbine for providing a pulse for every predetermined angular rotation of said turbine blades;

second pulse generating means responsive to said turbine for providing a second pulse for every predetermined angular rotation of said turbine blades, the occurrence of said second pulse being spaced in time with respect to the occurrence of said first pulse;

a flip-flop having a set input coupled to said first pulse generating means and a reset input coupled to said second pulse generating means and a reset input coupled to said second pulse generating means, said flip-flop having a first output being enabled when a first pulse generator and a second output being enabled when a second pulse is generated by said second pulse generating means; and third pulse generating means responsive to said turbine for providing a third pulse during a different predetermined angular rotation of said turbine blades, the occurrence of which is timed so that the third pulse occurs in the absence of a first pulse from said first generating means and a second pulse from said pulse generating means during the rotation of said turbine blades in a first direction and occurs in the presence of a first pulse and a second pulse during the rotation in a second direction.

14. The apparatus as defined in claim 13 and further including logic means responsive to said first pulse generating means, said second pulse generating means, and said third pulse generating means for determining whether a pulse is present or absent from said first and second pulse generating means during the time occurrence of said third pulse generating means.

15. In combination a turbine flow meter including output means and being adapted to be coupled in communication with a patient for providing electrical signals on the output means indicative of the breathing characteristics of the patient, the improvement of which includes the combination of:

a first summing means including, a first input means being coupled to the output means of said first means for receiving the electrical signals indicative of the patient's breathing characteristics, a second input means for receiving an error correction signal thereon, and an output means for providing a corrected signal indicative of the patient's breathing characteristics;

a feedback loop being coupled between the ouput means and input means of said first summing means for introducing error correction signals into the first summing means for correcting the electrical signals from the patient;

an absolute value amplifier means including an input means being coupled to the output means of said first summing means and an output means for providing output signals of an absolute value regardless of the value of the signals applied thereto;

a multiplier means including, a first input means being coupled to the output means of said absolute value amplifier means, a second input means for receiving sin/cos correction signals thereon and an output means, for multiplying the signals on the first input means and the second input means and for providing the multiplied signal on the output thereof;

an integrator means including, an input means being coupled to the output means of said multiplier and an output means being coupled to the second input means of said first summing means, for integrating the multiplied signal from said multiplier and for providing an integrated ramp signal indicative of the sine/cosine correction signal;

a second summing means, including a first input means for receiving a sine correction signal, a second input means for receiving a cosine correction signal and an output means being coupled to the second input means of said multiplier means, for summing the sine correction signal with the cosine correction signal;

a cosine correction means being coupled between the first input of said second summing means and the output means of said integrator means, said cosine correction means including a resistive element having a value $-V \cos \theta$ and a potentiometer being coupled in series; and a sine correction means being coupled between the second input means of said second summing means and the input means of said absolute value amplifier means, said sine correction means including a resistive element having a value $u \sin \theta$ and a potentiometer being coupled in series.

16. The combination as defined in claim 15 and the improvement further including, a converter means being coupled between the output means of said turbine flowmeter and the first input means of said first summing means for converting said signals to an analog level indicative of the frequency of the electrical signals applied thereto.

17. In combination with a turbine fluid flowmeter, said flowmeter including blades which are adapted to rotate in response to the direction of fluid flow therein, the improvement of which includes the combination of:

first pulse generating means being responsive to the fluid flow in said flowmeter for providing first pulse at a second predetermined angular position of said blades during rotation thereof;

second pulse generating means being responsive to the fluid flow in said flowmeter for providing a second pulse at a second predetermined angular position of turbine blades during rotation thereof, the occurrence of said second pulse being spaced in time with respect to the occurrence of said first pulse;

a flip-flop having a set input being coupled to said first pulse generating means and a reset input being coupled to said second pulse generating means, said flip-flop having a first output being enabled when a first pulse is generated by said first pulse generator and a second output being enabled when a second pulse is generated by said second pulse generating means; and third pulse generating means being responsive to said flowmeter for providing a third pulse during a third predetermined angular position of said blades during the relation thereof, the occurrence of which is timed so that the third pulse occurs in the absence of a first pulse from said first generating means and the absence of a second pulse from said pulse generating means during the rotation of said blades in a first direction and occurs in the presence of a first pulse from said first pulse generating means and the presence of a second pulse from said second pulse generating means during the rotation in a second direction.

18. The combination as defined in claim 17 and further including logic means responsive to said first pulse generating means, said second pulse generating means, and said third pulse generating means for determining whether a pulse is present or absent from said first and second pulse generating means during the time occurrence of said third pulse generating means.

References Cited

UNITED STATES PATENTS

| 3,043,143 | 7/1962 | Hollmann | 73—231 |
| 3,135,116 | 6/1964 | Kwong et al. | 73—231 |
| 3,425,274 | 2/1969 | Clement et al. | 73—229X |

FOREIGN PATENTS

| 549,242 | 11/1942 | Great Britain | 73—231 |
| 752,496 | 7/1956 | Great Britain | 73—231 |
| 791,655 | 3/1958 | Great Britain | 73—231 |
| 803,069 | 10/1958 | Great Britain | 73—231 |
| 170,702 | 8/1965 | U.S.S.R. | 73—231 |
| 185,436 | 1/1967 | U.S.S.R. | 128—2.08 |

OTHER REFERENCES

Berwin, T. W.: I.R.E. Trans. on Electronic Computers, March 1960, pp. 62–71.

Dijstelbergen, H. H.: Instrument Review, June 1966, pp. 241–244.

RICHARD A. GAUDET, Primary Examiner

K. L. HOWELL, Assistant Examiner

U.S. Cl. X.R.

73—229; 128—2.05F